(12) United States Patent
Barda

(10) Patent No.: US 8,200,748 B2
(45) Date of Patent: Jun. 12, 2012

(54) SYSTEM AND METHOD FOR DIRECTING DATA RETRIEVAL REQUESTS TO A DATA RETRIEVAL DEVICE

(75) Inventor: Noam Barda, Herzeliya Pitoah (IL)

(73) Assignee: SAP AG, Walldorf (DE)

( * ) Notice: Subject to any disclaimer, the term of this patent is extended or adjusted under 35 U.S.C. 154(b) by 2670 days.

(21) Appl. No.: 10/836,520

(22) Filed: Apr. 29, 2004

(65) Prior Publication Data
US 2005/0246414 A1    Nov. 3, 2005

(51) Int. Cl.
*G06F 15/16* (2006.01)
(52) U.S. Cl. .................................... 709/203; 709/236
(58) Field of Classification Search .................. 709/203, 709/236
See application file for complete search history.

(56) References Cited

U.S. PATENT DOCUMENTS

| | | | |
|---|---|---|---|
| 6,049,821 A * | 4/2000 | Theriault et al. ............... | 709/203 |
| 6,163,779 A * | 12/2000 | Mantha et al. ................ | 707/100 |
| 6,226,642 B1 * | 5/2001 | Beranek et al. ................ | 707/10 |
| 6,510,469 B1 * | 1/2003 | Starnes et al. ................ | 709/247 |
| 7,082,476 B1 * | 7/2006 | Cohen et al. ................... | 709/246 |
| 7,096,418 B1 * | 8/2006 | Singhal et al. ............. | 715/501.1 |
| 2002/0055966 A1 * | 5/2002 | Border et al. ................. | 709/200 |

OTHER PUBLICATIONS

Novell ichain 2.3 Administration Guide, "Rewriter Support," http://www.novell.com/documentation/ichain23/ichain23/data/bjr0ki.html, printed on Jul. 28, 2004.
Netscape Proxy Server Administrator's Guide, Chapter 7, "Reverse Proxy," http://developer.netscape.com/docs/manuals/proxy/adminux/revpxy.htm, last updated Feb. 25, 1998.
Apache, "Apache module mod proxy," http://httpd.apache.org/docs/mod/mod_proxy.html, printed on Jul. 28, 2004.

* cited by examiner

*Primary Examiner* — Jeffrey Pwu
*Assistant Examiner* — Farhad Ali
(74) *Attorney, Agent, or Firm* — Kenyon & Kenyon LLP

(57) ABSTRACT

A system and method for directing data retrieval requests to a data retrieval device. A processor, upon a request for a first content element, retrieves the first content element, and replaces a first address of a second content element that is embedded within the first content element with a local address, upon a first request for the second content element, directed to the processor by the local address, retrieves and stores in a cache memory the second content element, and, upon a second request for the second content element, retrieves the second content element from the cache memory.

16 Claims, 4 Drawing Sheets

SYSTEM AND METHOD FOR DIRECTING DATA RETRIEVAL REQUESTS TO A DATA RETRIEVAL DEVICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND INFORMATION

A content server may provide data to a requesting client, e.g. a web browser, over the internet, an intranet, or any network known in the art. It may be desirable to cache the data to enable faster response times to subsequent requests for the same data by the same or a different client. One or more data retrieval devices, e.g., a proxy server and/or a portal may be used to cache the data. The data retrieval device may be provided to perform additional or other tasks, e.g., to filter data sent to the client, perform operations upon data sent to the client, etc. For example, a portal may be used to aggregate data from a number of content servers to provide the client with a focus in a search for data.

To implement a data retrieval device, client settings may be set, e.g., by a user, to route all data retrieval requests, e.g., requests for web pages, to a particular data retrieval device. The data retrieval device may then intercept the client's data retrieval requests and forward the requests to a content server. The content server may transmit toward the data retrieval device the requested data. The data retrieval device may, e.g., cache the received data, and forward the data to the client.

However, it may be desirable to implement a number of data retrieval devices, each to handle different client requests. For example, a particular data retrieval device may be provided to handle requests for data transmission via the internet, and a second data retrieval device may be provided to handle requests for data transmission via an intranet. The client may be equipped with data retrieval routing settings that can be set to route requests to only one data retrieval device. Additionally, the configurable settings may not support a configuration for a particular data retrieval device. For example, the settings may support only proxy servers and not portals.

Accordingly, there is a need in the art for a system and/or method to direct a client's data requests to a data retrieval device without the use of client settings.

DETAILED DESCRIPTION

Embodiments of the present invention generally relate to data retrieval via a data retrieval device. More particularly, embodiments relate to the redirection of data requests to a data retrieval device.

A client may request from a data retrieval device a data container. A data container is a set of data, e.g., a data file, that includes data of a number of content elements that may include data of, e.g., text, graphics, etc. A data container may be an application, information, and/or service that can be visualized, e.g., in a web browser window. The data container may include one principal content element, the first content element returned.

Figure 1:
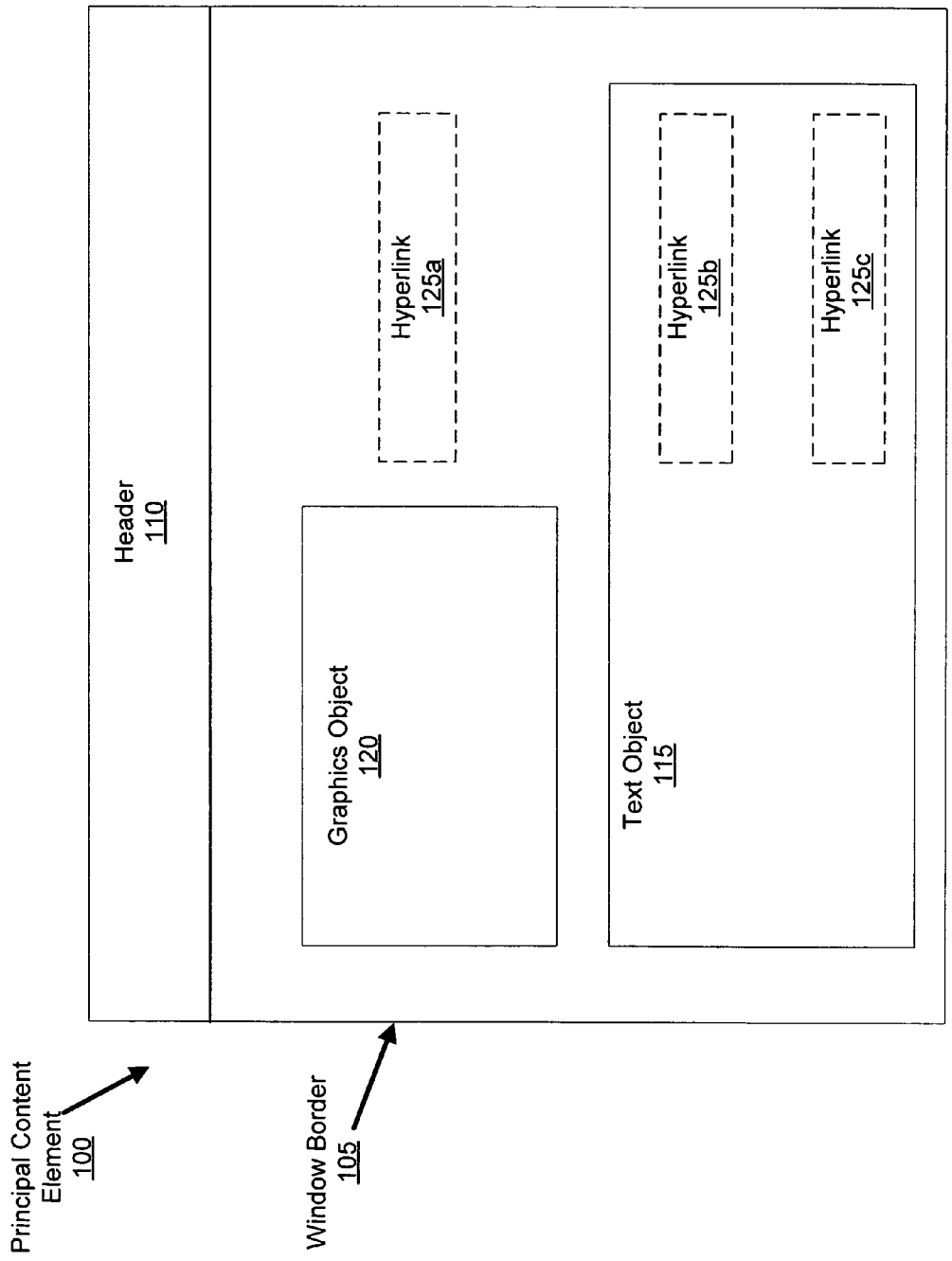
FIG. 1 is a block diagram that illustrates an example layout of a principal content element, according to an embodiment of the present invention.

FIG. 1 is a block diagram that illustrates an example embodiment of the layout of a principal content element. Principal content element 100 may include, e.g., window border 105, header 110, text object 115, graphics object 120, etc. Principal content element 100 may directly include these objects. Alternatively, principal content element 100 may include location addresses, e.g., Uniform Resource Locators (URL), to some or all of these objects. After principal content element 100 is returned to a requesting client, the URLs may generate automatic continuous requests for the referenced objects. The URLs may also be embedded in the form of hyperlinks 125a-c within the principal content element. Hyperlinks 125a-c may generate further requests for objects, e.g., when hyperlinks 125a-c are manually selected. Hyperlinks 125a-c may be embedded in the various content objects of principal content element 100. For example, hyperlink 125b may be embedded within text object 115.

The content elements and their respective URLs may be arranged according to an hierarchy. For example, a principal content element may include embedded URLs that point to other content elements. These other content elements may also include embedded URLs that point to other sub-content elements, etc. The content elements may be coded, e.g., in hyper text markup language (HTML).

Figure 2:
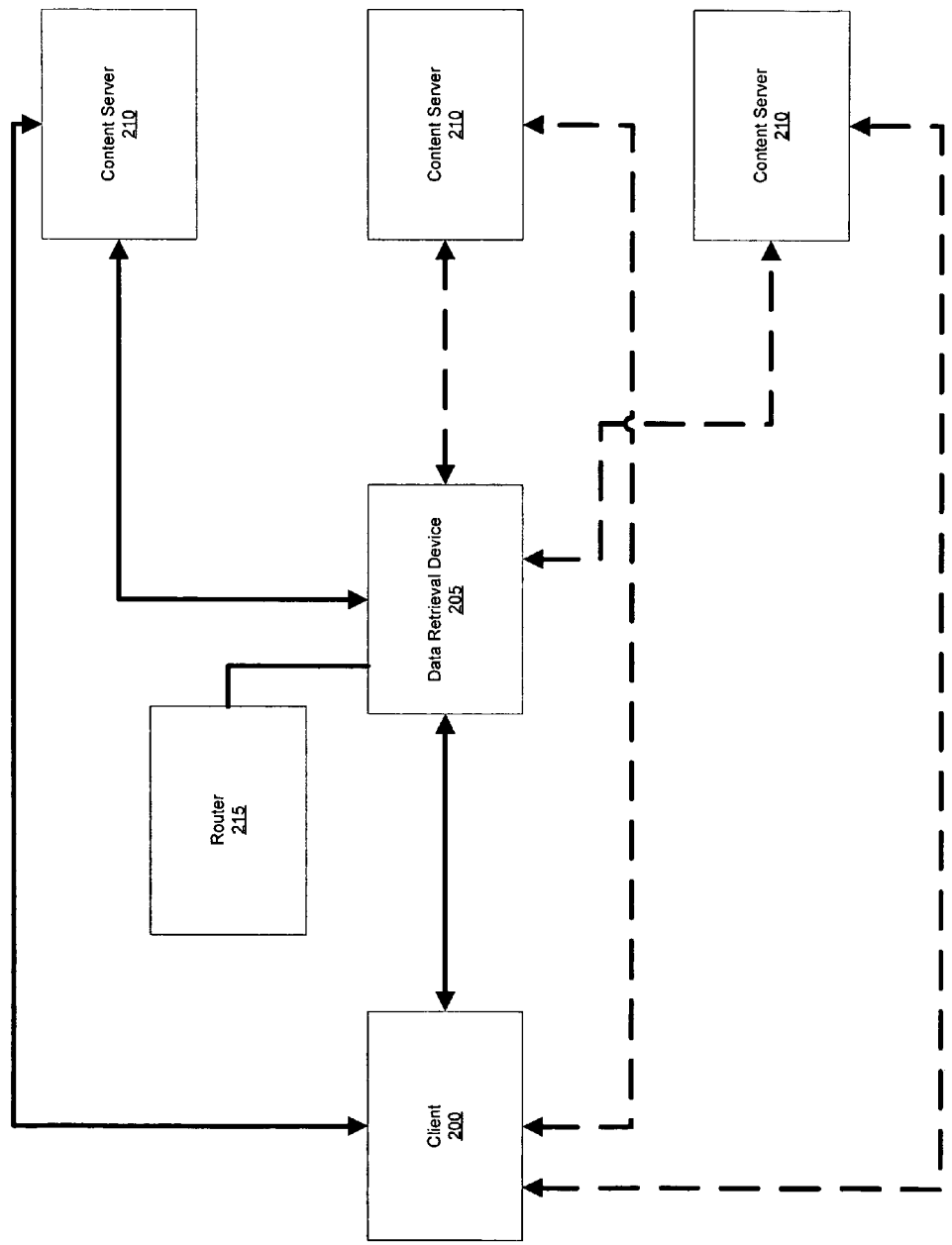
FIG. 2 is a block diagram that illustrates the components of an example embodiment of the physical architecture of the present invention.

FIG. 2 is a block diagram that illustrates an example embodiment of the physical architecture of the present invention. Data retrieval device 205 and/or client 200 may be in communication with one or many content servers 210. The data container may be sent one content element at a time, e.g., between a content server 210 and data retrieval device 205, and/or between content server 210 and client 200, and/or between data retrieval device 205 and client 200. For example, the principal content element may be initially sent. Client 200 may subsequently send further requests for the rest of the content elements. These further requests may be generated by the URLs embedded within the principal content element, and may be directed to the locations to which the embedded URLs point. Alternatively, the client 200's settings may be set to forward all of the further requests to data retrieval device 205.

Client 200 may not be equipped with settings for directing the further requests to data retrieval device 205. To direct the further requests to data retrieval device 205, without the use of client 200's settings, in an embodiment of the present invention, data retrieval device 205 may provide router 215 to change embedded URLs of content elements of a data container to point to data retrieval device 205. Consequently, data retrieval device 205 may receive subsequent requests and return the requested content elements from a local memory of data retrieval device 205, e.g., cache, if therein. Alternatively, router 215 may be provided as an entity external to and in communication with data retrieval device 205. Router 215 may change URLs embedded within content elements as data retrieval device 205 retrieves the content elements from content server 210.

Figure 3:
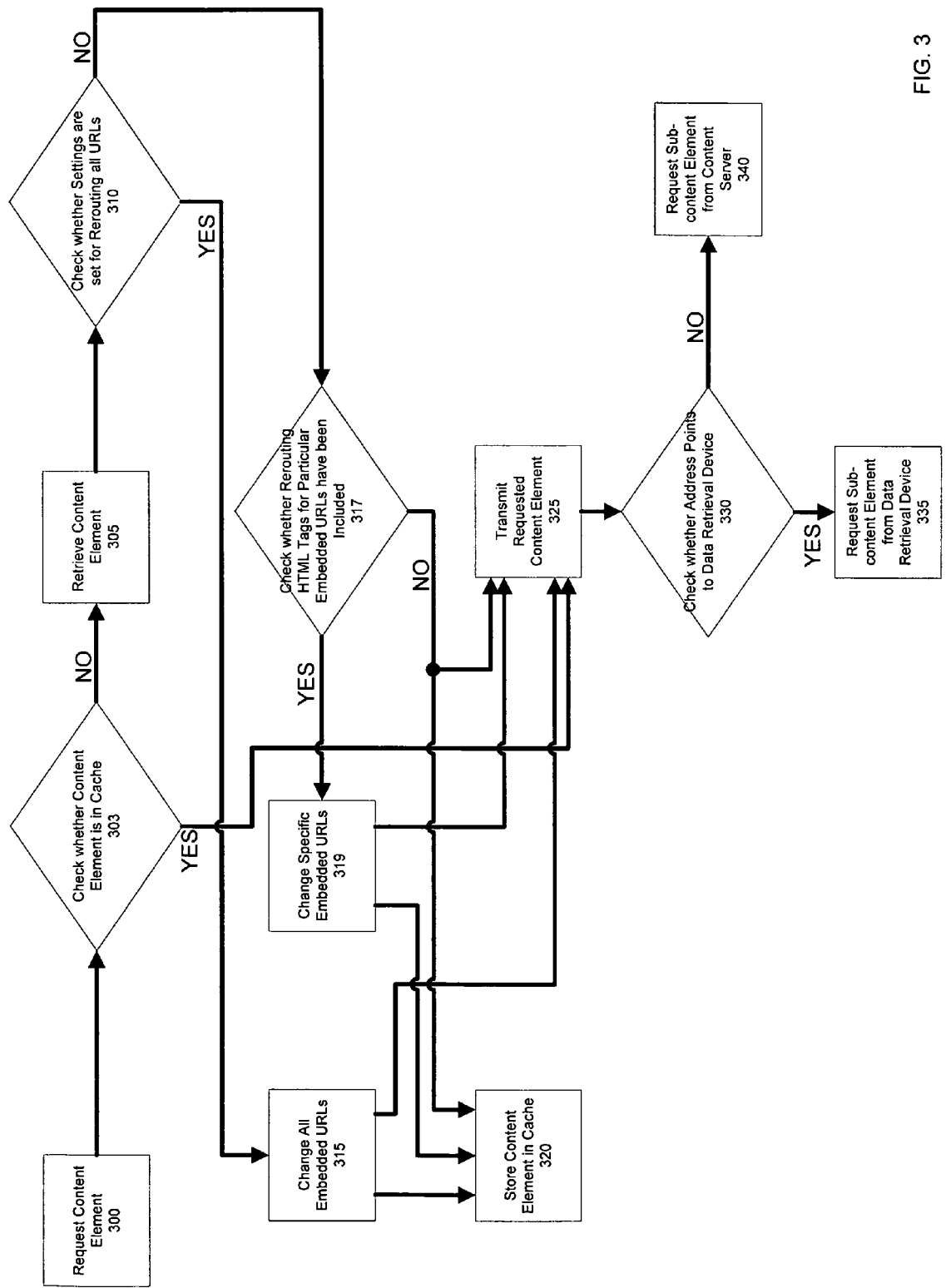
FIG. 3 is a flowchart that illustrates an example procedure in which a data container request may be processed, according to an embodiment of the present invention.

FIG. 3 is a flowchart that illustrates an example procedure in which a content element request may be processed. The content element request may be directed towards a data retrieval device, e.g., if the request is for a principal content element of a data container, initiated by a request for the data container. Alternatively, the content element request may be directed towards the data retrieval device, e.g., as a result of a previously made change to the URL of the requested content element. In an embodiment of the present invention, in 300, a content element request may be directed towards a data retrieval device. In 303, the data retrieval device may check cache memory for the requested content element. If the data retrieval device determines that the requested content element is in cache, the data retrieval device may, in 325, transmit the requested content element toward the client. If the data retrieval device determines that the requested content element is not in cache, the data retrieval device may, in 305, retrieve the requested content element from a content server. The requests and the data may be transmitted using any communications protocol known in the art, e.g., hyper text transfer protocol (http).

In 315, a router may change embedded URLs of retrieved content elements to point to a location in the data retrieval device's cache, rather than to the content server. In 320, the data retrieval device may then store the retrieved content element in the cache memory. If, in 315, the router changed embedded addresses of the retrieved content element, then in 320, the data retrieval device stores in cache the retrieved content element with these rerouted addresses. While storing the content element in cache, the data retrieval device may, in 325, simultaneously or otherwise, transmit the retrieved content element toward the client. The client's subsequent content element requests may now be directed by the rerouted addresses to the data retrieval device. Accordingly, in 330, the client may determine whether addresses referencing sub-content elements point to the data retrieval device or to the content server. If an address points to the data retrieval device, the client may, in 335, request the sub-content element from the data retrieval device. If an address points to the content server, the client may, in 340, request the sub-content element from the content server.

According to an embodiment of the present invention, the content server may include within the HTML of a content element an HTML tag that instructs the router to reroute a particular embedded address so that the address points to the data retrieval device. According to this embodiment, in 317, the router may check each embedded URL of the content element to ascertain whether a rerouting instruction HTML tag has been included for each particular embedded URL. If the content server does not include this HTML tag for a particular URL, the router may not reroute the particular URL. Accordingly, if the content server does not include this HTML tag for a particular URL that references a particular sub-content element, the client may, in 340, request the particular sub-content element directly from the content server, bypassing the data retrieval device.

According to an embodiment of the present invention, settings of the data retrieval device may be set to instruct the router to change all URLs of a retrieved content element, even if a rerouting HTML tag is not included. In 310, the router may check whether the settings are set for rerouting all URLs. If the settings are set for rerouting, the router may, in 315, change a particular URL, even if the content server has not included a tag that is specific to the particular URL. If, in 310, the router determines that the settings are not set for rerouting all URLs, the router may, in 317, check each embedded URL of the content element to ascertain whether a rerouting instruction HTML tag has been included for each particular embedded URL.

According to an embodiment of the present invention, settings may indicate whether a retrieved content element is stored in cache. According to this embodiment, the data retrieval device may, in 320, store the retrieved content element in cache only if settings indicate that the particular retrieved content element, or all retrieved content elements are to be stored in cache.

According to an embodiment of the present invention, the data retrieval device may be a proxy server. The proxy server may be provided, e.g., to filter data transmitted to the client, to cache requested data containers for faster response times to subsequent requests, or for any other use known in the art.

According to one embodiment of the present invention, the data retrieval device may be a portal, e.g., that aggregates data of a collection of content servers to provide the client with focus in a search for data. According to this embodiment, the data retrieval device may perform tasks other than data retrieval. The portal may actively seek relevant data and content servers. The portal may, for example, integrate retrieved data containers with and format the retrieved data containers for a client's applications.

In an embodiment of the present invention, the data retrieval device may retrieve data containers from various content servers. The data retrieval device may retrieve all content elements of a particular data container from the same content server, but may retrieve content elements of a number of data containers from a number of content servers. According to this embodiment, a URL associated with a data container request, i.e. a request for the principal content element of the data container, may indicate the particular content server from which content elements of the data container are to be retrieved. According to this embodiment, in 315 and in 317, when the router changes an embedded URL referencing a sub-content element, the router may include in the changed URL a parameter that indicates the particular content server from which the data retrieval device may, in 305, retrieve the sub-content element.

Figure 4:
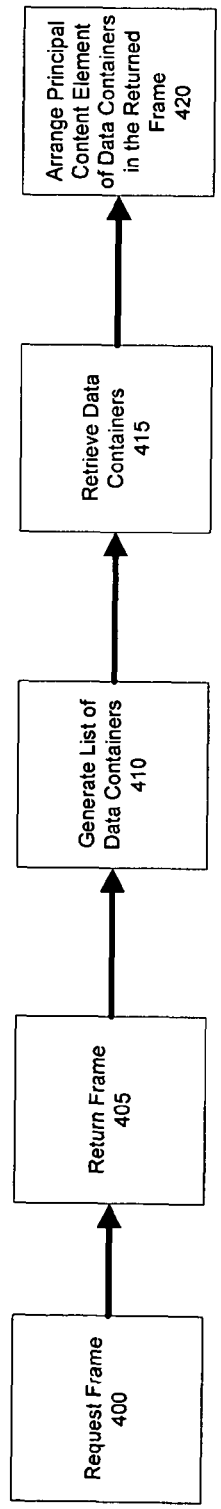
FIG. 4 is a flowchart that illustrates an example procedure for arranging a frame in response to a client request, according to an embodiment of the present invention.

FIG. 4 is a flowchart that illustrates an example procedure for arranging a frame in response to a client request. According to one embodiment of the present invention, in 400, a client may request a frame from a data retrieval device. A frame may be a collection of data containers, e.g. grouped together in a web browser window. The collection of data containers to be retrieved and arranged in the frame may be specified or unspecified by the client. In 405, in response to the frame request, the data retrieval device may transmit toward the client a frame. In 410, the data retrieval device may generate a list of data containers that pertain to the requested frame and may treat the frame request as multiple data container requests corresponding to the data containers of the frame. In 415, the data retrieval device may retrieve each of the requested data containers. According to this embodiment, in 420, when the data retrieval device returns the data containers, the data retrieval device may arrange the principal content elements of the data containers within the returned frame. The client may subsequently direct all subsequent content element requests to the data retrieval device or a content server, depending on whether the router rerouted a particular content element's URL.

According to an embodiment of the present invention, in 415, the data retrieval device may retrieve data containers from a number of content servers, and, in 420, arrange their principal content elements in a single frame.

Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A system for retrieval of at least one content element comprising:
 a cache memory configured to store the at least one content element; and
 a processor, the processor configured to:
  upon a request for a first content element:
   retrieve the first content element, wherein the first content element includes a first address that references a location of a server from which to retrieve a second content element; and
   replace the included first address with a local address that is associated with the processor and that includes a parameter that identifies the server;
  upon a first request for the second content element, retrieve the second content element from the server based on the parameter of the local address and store the second content element in the cache memory; and
  upon a second request for the second content element, retrieve the second content element from the cache memory, the first and the second requests for the second content element directed by the local address towards the processor.

2. The system of claim 1, wherein the addresses are Uniform Resource Locators.

3. The system of claim 1, further comprising:
 a proxy server configured to retrieve at least one content element via the processor.

4. The system of claim 1, further comprising:
 a portal configured to retrieve at least one content element via the processor.

5. The system of claim 1, wherein each of the content elements is coded in hyper text markup language (HTML), and the addresses are included within the HTML.

6. The system of claim 5, wherein a particular address is replaced upon a condition that the HTML includes an instruction for replacing the particular address.

7. The system of claim 1, wherein a particular address is replaced upon a condition that processor settings include an instruction for replacing addresses of a retrieved content element.

8. The system of claim 1, further comprising:
 a client,
  wherein the client is a web browser, and wherein the requests are initiated by the client.

9. The system of claim 1, wherein the processor is configured to store the first content element in the cache memory such that the local address is included in the stored first content element.

10. A method for retrieving at least one content element comprising:
 upon a request for a first content element:
  retrieving the first content element, wherein the first content element includes a first address that references a location of a server from which to retrieve a second content element; and
  replacing the included first address with a local address that is associated with a processor and that includes a parameter that identifies the server;
 upon a first request for the second content element:
  retrieving the second content element from the server based on the parameter of the local address; and
  storing the second content element in a cache memory; and
 upon a second request for the second content element:
  retrieving the second content element from the cache memory,
   wherein the content elements are retrieved by the processor, and the first and second requests for the second content element are directed by the local address towards the processor.

11. The method of claim 10, wherein the addresses are Uniform Resource Locators.

12. The method of claim 10, further comprising:
 coding each content element in hyper text markup language (HTML); and
 including the addresses within the HTML.

13. The method of claim 12, wherein a particular address is replaced upon a condition that the HTML includes an instruction for replacing the particular address.

14. The method of claim 10, wherein a particular address is replaced upon a condition that processor settings include an instruction for replacing addresses of a retrieved content element.

15. The method of claim 10, further comprising:
 storing the first content element in the cache memory such the local address is included in the stored first content element.

16. An article of manufacture comprising a computer-readable medium having stored thereon instructions adapted to be executed by a processor, the instructions which, when executed, define a series of steps to be used for retrieving at least one content element comprising:
 upon a request for a first content element:
  retrieving the first content element, wherein the first content element includes a first address that references a location of a server from which to retrieve a second content element; and
  replacing the included first address with a local address that is associated with a processor and that includes a parameter that identifies the server;
 upon a first request for the second content element:
  retrieving the second content element from the server based on the parameter of the local address; and
  storing the second content element in a cache memory; and
 upon a second request for the second content element:
  retrieving the second content element from the cache memory,
   wherein the content elements are retrieved by the processor, and the first and second requests for the second content element are directed by the local address towards the processor.

* * * * *